US012807171B2

(12) United States Patent
Koh et al.

(10) Patent No.: US 12,807,171 B2
(45) Date of Patent: Nov. 24, 2026

(54) AUDIBLE MODE-BASED ALERTING IN MULTI-MODE VEHICLE SYSTEMS

(71) Applicant: Rivian IP Holdings, LLC, Irvine, CA (US)

(72) Inventors: Kok Wei Koh, Mountain View, CA (US); Matthew Royce Miller, San Francisco, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 169 days.

(21) Appl. No.: 18/790,525

(22) Filed: Jul. 31, 2024

(65) Prior Publication Data

US 2025/0263087 A1 Aug. 21, 2025

Related U.S. Application Data

(60) Provisional application No. 63/555,393, filed on Feb. 19, 2024.

(51) Int. Cl.
*B60W 50/14* (2020.01)
*B60W 30/14* (2006.01)
*G06F 3/16* (2006.01)

(52) U.S. Cl.
CPC ............. *B60W 50/14* (2013.01); *G06F 3/165* (2013.01); *B60W 30/14* (2013.01); *B60W 2050/143* (2013.01)

(58) Field of Classification Search
None
See application file for complete search history.

(56) References Cited

U.S. PATENT DOCUMENTS

| | | | | |
|---|---|---|---|---|
| 2015/0197195 A1* | 7/2015 | Hera | ........................ | H03G 5/16 381/86 |
| 2016/0150070 A1* | 5/2016 | Goren | ............... | H04M 1/72421 455/418 |
| 2018/0239352 A1* | 8/2018 | Wang | .................... | B60W 50/14 |
| 2020/0192360 A1* | 6/2020 | Zheng | ............... | B60W 60/0059 |
| 2023/0271283 A1* | 8/2023 | Murota | .................... | B23Q 1/70 173/171 |

* cited by examiner

*Primary Examiner* — Thomas S Mccormack
(74) *Attorney, Agent, or Firm* — Patterson + Sheridan, LLP

(57) ABSTRACT

In an embodiment, a method of audibly alerting a user of a vehicle includes receiving, in a vehicle control system, a first event associated with a first operational mode related to the vehicle and, responsive to the first event, triggering, by the vehicle control system, playback of first audio indicative of the first operational mode. The method also includes receiving, in the vehicle control system, a second event associated with a second operational mode related to the vehicle and, responsive to the second event, triggering, by the vehicle control system, playback of second audio in correspondence to a predefined time relationship between the first audio and the second audio, such that substantially continuous audio indicative of the second operational mode is played to the user. The substantially continuous audio includes at least a portion of the first audio and at least a portion of the second audio.

19 Claims, 11 Drawing Sheets

AUDIBLE MODE-BASED ALERTING IN MULTI-MODE VEHICLE SYSTEMS

CROSS-REFERENCE TO RELATED APPLICATIONS

This application claims priority to and benefit of U.S. Provisional Patent Application No. 63/555,393, filed Feb. 19, 2024, which is assigned to the assignee hereof and hereby expressly incorporated herein in its entirety as if fully set forth below and for all applicable purposes.

INTRODUCTION

The present disclosure relates to vehicle dynamics, and more particularly, but not by way of limitation, to audible mode-based alerting in multi-mode vehicle systems.

SUMMARY

In certain embodiments, one general aspect includes a method of audibly alerting a user of a vehicle. The method includes receiving, in a vehicle control system, a first event associated with a first operational mode related to the vehicle. The method also includes, responsive to the first event, triggering, by the vehicle control system, playback of first audio indicative of the first operational mode. The method also includes receiving, in the vehicle control system, a second event associated with a second operational mode related to the vehicle. The method also includes, responsive to the second event, triggering, by the vehicle control system, playback of second audio in correspondence to a predefined time relationship between the first audio and the second audio, such that substantially continuous audio indicative of the second operational mode is played to the user. The substantially continuous audio includes at least a portion of the first audio and at least a portion of the second audio.

In certain embodiments, another general aspect includes a system for audibly alerting a user of a vehicle. The system includes a vehicle speaker and a vehicle control system communicably coupled to the vehicle speaker. The vehicle control system is operable to receive a first event associated with a first operational mode related to the vehicle and, responsive to the first event, trigger playback, on the vehicle speaker, of first audio indicative of the first operational mode. The vehicle control system is further operable to receive a second event associated with a second operational mode related to the vehicle and, responsive to the second event, trigger playback, on the vehicle speaker, of second audio in correspondence to a predefined time relationship between the first audio and the second audio, such that substantially continuous audio indicative of the second operational mode is played to the user. The substantially continuous audio includes at least a portion of the first audio and at least a portion of the second audio.

DETAILED DESCRIPTION

Figure 1:
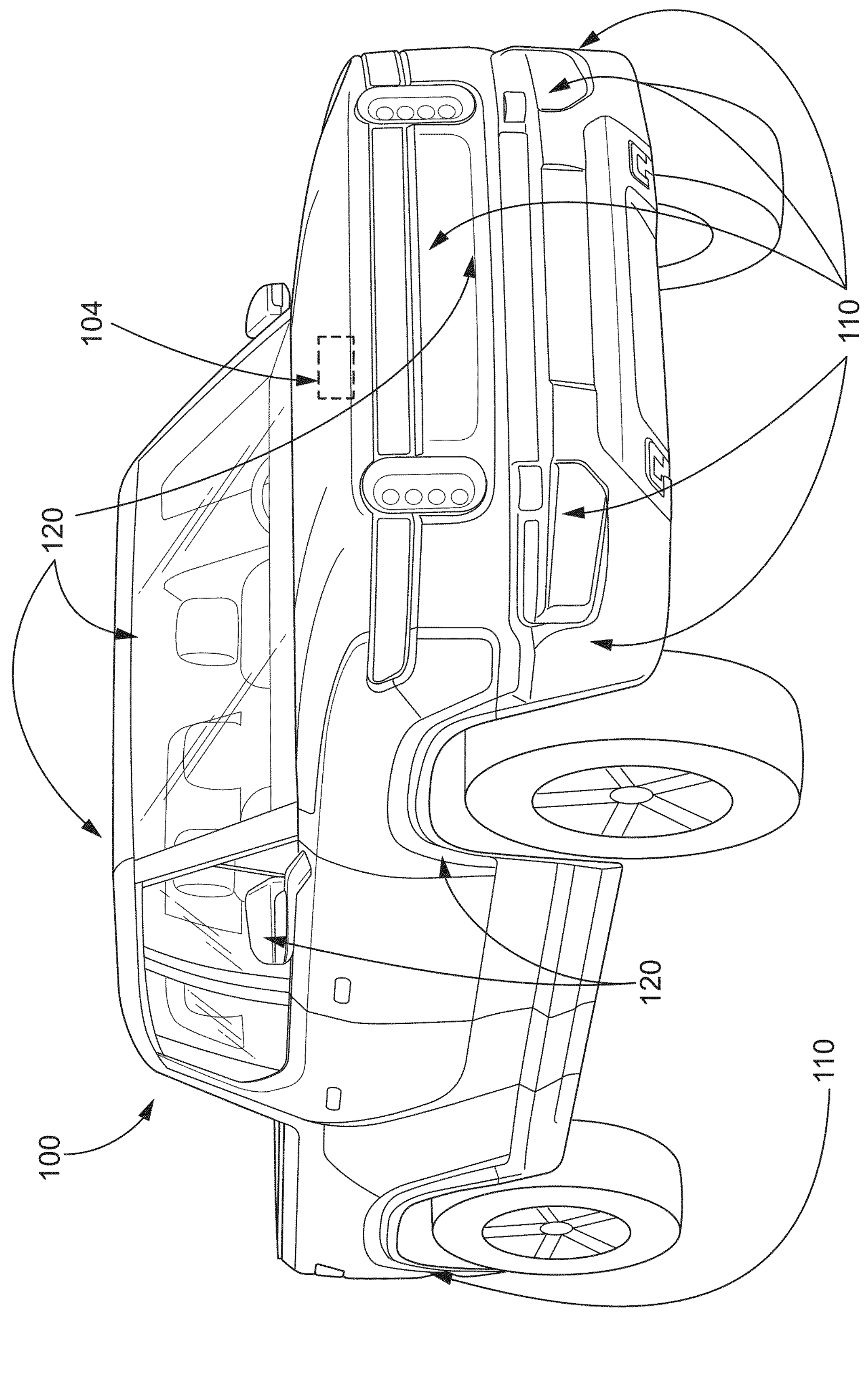
FIG. 1 illustrates an example of a vehicle, in accordance with certain embodiments of the present disclosure.

In certain vehicles, different operational modes can be engaged based on the timing of particular types of events that occur during vehicle operation. For example, a single event can correspond to engagement of one operational mode, while two events in rapid succession can correspond to engagement of a different operational mode. The operational modes can relate, for example, to an advanced driver-assistance system (ADAS) of the vehicle. In various embodiments, the events can be user inputs (e.g., a button press, a pull-down of a drive stalk, etc.), automated indicators of safety conditions (e.g., a notification from a blind spot monitoring system), and/or the like.

In some such vehicles, different audible alerts can be provided to a user (e.g., driver) based on the operational mode. Audible alerts can include sounds, such as chimes, notes, chirps, alarms, beeps, short phrases, and/or the like, that serve a notification or reporting function for the user. Audible alerts can be advantageous since they notify the user in a manner that is not visually distracting. However, from the perspective of a vehicle system, it is not generally known at the time of a first event whether there will be a second event. Consequently, it is technically challenging to audibly alert the user, timely and accurately, based on a current operational mode of the vehicle.

For example, in certain vehicles, a user can engage different operational modes via the same input device (e.g., a drive stalk). User inputs via the input device can be treated as events, the timing of which impacts which mode is engaged. According to this example, the operational modes can correspond to automation levels, such as levels of automatic driver assistance provided by the ADAS, where the automation levels progressively increase in the amount of automatic driver assistance provided. Examples of levels of automatic driver assistance are adaptive cruise control (ACC) and highway assistance (HWA). For example, one user input may be interpreted as engaging one level of automatic driver assistance, such as ACC, while two user inputs in rapid succession may be interpreted as engaging a higher level of automatic driver assistance, such as HWA.

As mentioned above, from the perspective of a vehicle system, it is not generally known at the time of a first user input whether there will be a second user input. Therefore, if the vehicle system initiates an audible alert upon receipt of the first user input (e.g., an alert that ACC is engaged), such alert may be rendered erroneous upon subsequent receipt of the second user input (e.g., because the second user input is indicative of HWA being engaged). In that scenario, the erroneous alert could cause user confusion and potentially compromise vehicle safety. Furthermore, if HWA, for example, is unavailable for any reason (e.g., due to a state of the vehicle), the alert that ACC is engaged may be particularly misleading and confusing, since the user did not request ACC and, in fact, will not be able to engage HWA.

Similar problems arise relative to other types of vehicle operational modes. For example, in certain vehicles, a vehicle system can engage different operational modes based on automated notifications of safety conditions relative to the vehicle. The automated notifications can be treated as events, the timing of which impacts which mode is engaged. The automated notifications can be generated, for example, by a blind spot monitoring system or other safety system. According to this example, the operational modes can correspond to alerting levels provided by the ADAS, where the alerting levels progressively increase in severity and/or urgency. For example, one automated notification may be interpreted as engaging one alerting level, while two automated notifications in rapid succession may be interpreted as engaging a higher alerting level. Each alerting level can be associated with different audible alerting (e.g., different sounds, tempo, pitch, etc.), thus creating potential for user confusion similar to the discussion above relative to levels of automatic driver assistance.

Taking a vehicle system with two operational modes as an example, one way to approach the above problem is for the vehicle system to maintain two audio segments, one for each operational mode. Upon receipt of the first event, the audio segment for the first operational mode could be played. Upon receipt of the second event, the audio segment for the first operational mode could be terminated, if it is still playing, and the audio segment for the second operational mode could then be played in its entirety. From the perspective of the user, however, the playback and subsequent termination of the audio segment for the first operational mode might be noticeably abrupt, with the playback sounding "clipped." Further, the fact that both audio segments were at least partially played might cause user confusion about which operational mode is currently engaged.

The present disclosure describes examples of audibly alerting a user regarding a current operational mode of a vehicle, for example, to minimize user confusion and improve audio clarity. In various embodiments of the present disclosure, after receiving an event, a vehicle system can trigger first audio indicating engagement of a first operational mode (e.g., an audio file containing a chime). If a second event is received while the first audio is playing, the vehicle system can stop the first audio at a predefined termination point and, substantially simultaneously, trigger a second audio segment (e.g., an audio file containing one or more additional chimes to complete a multi-chime sequence). In various embodiments, the user can thereby hear substantially continuous audio feedback indicating engagement of the second operational mode.

For illustrative purposes, examples are periodically provided herein relative to levels of automatic driver assistance provided by an ADAS (e.g., ACC and HWA), sometimes referred to herein as "ADAS automation levels." It should be appreciated, however, that the principles described herein are also applicable to other types of operational modes, such as levels of alerting provided by an ADAS, sometimes referred to herein as "ADAS alerting levels." Other examples of operational modes to which the principles described herein may be applied will be apparent to one skilled in the art after a detailed review of the present disclosure.

FIG. 1 illustrates an example vehicle 100, in accordance with certain embodiments of the present disclosure. Vehicle 100 may include multiple sensors 110, multiple cameras 120, and a control system 104. As an example and not by way of limitation, the sensors 110 may be, or include, an accelerometer, a gyroscope, a magnetometer, a global positioning satellite (GPS) signal sensor, a vibration sensor (e.g., piezoelectric accelerometer), a light detection and ranging (LiDAR) sensor, a radio detection and ranging (RADAR) sensor, an ultrasonic sensor, a temperature sensor, a pressure sensor, a humidity sensor, a chemical sensor, an electromagnetic proximity sensor, an electric current sensor, a motion sensor, another suitable sensor, or a combination thereof. As an example and not by way of limitation, a camera 120 may be a still image camera, a video camera, a 3D scanning system (e.g., based on modulated light, laser triangulation, laser pulse, structured light, light detection and ranging (LiDAR)), an infrared camera, another suitable camera, or a combination thereof. Vehicle 100 may include various controllable components (e.g., doors, seats, windows, lights, HVAC, entertainment system, security system) and instrument and information displays and/or interactive interfaces.

While FIG. 1 depicts one or more of cameras 120 in particular locations, it should be appreciated that any suitable number of cameras may be employed (e.g., any number of cameras positioned at a front, rear and each side of vehicle 100). Such cameras 120 may be mounted at any suitable respective positions or portions of vehicle 100 in order to facilitate the capturing of images of the entire region or environment around vehicle 100, while vehicle 100 is stationary or in motion. A series of images may be captured by cameras 120, including any suitable number of images. In some embodiments, images may be captured repeatedly, e.g., at a predetermined frequency, to capture the surrounding environment of vehicle 100. In similar fashion, sensors 110 may be deployed in any suitable number and/or in any suitable location relative to vehicle 100.

More particularly, in certain embodiments, cameras 120 are configured to capture images of blind spots relative to vehicle 100, as all or part of their field of view. For example, in certain embodiments, at least one of the cameras 120 is configured to capture images of a blind spot on a driver side of vehicle 100, and at least one of the cameras 120 is configured to capture images of a blind spot on a passenger side of vehicle 100. In addition, or alternatively, sensors 110 are configured to produce outputs indicative of a presence of a vehicle or object in such a blind spot, for example, on the driver side or passenger side of vehicle 100.

Control system 104 may enable control of various systems on-board the vehicle. Control system 104 may communicate with, and control operation of, cameras 120 and sensors 110. In certain aspects, control system 104 can provide ADAS functionality for multiple operational modes, including functionality to audibly alert a user in a way that is indicative of a current operational mode. In some embodiments, the operational modes can correspond to ADAS automation levels, such as ACC and HWA, where the ADAS automation levels progressively increase in the amount of automatic driver assistance provided. In addition, or alternatively, the operational modes can correspond to ADAS alerting levels, where the ADAS alerting levels progressively increase in severity and/or urgency. Example operation of control system 104 will be described in greater detail relative to FIG. 3.

Figure 2A:
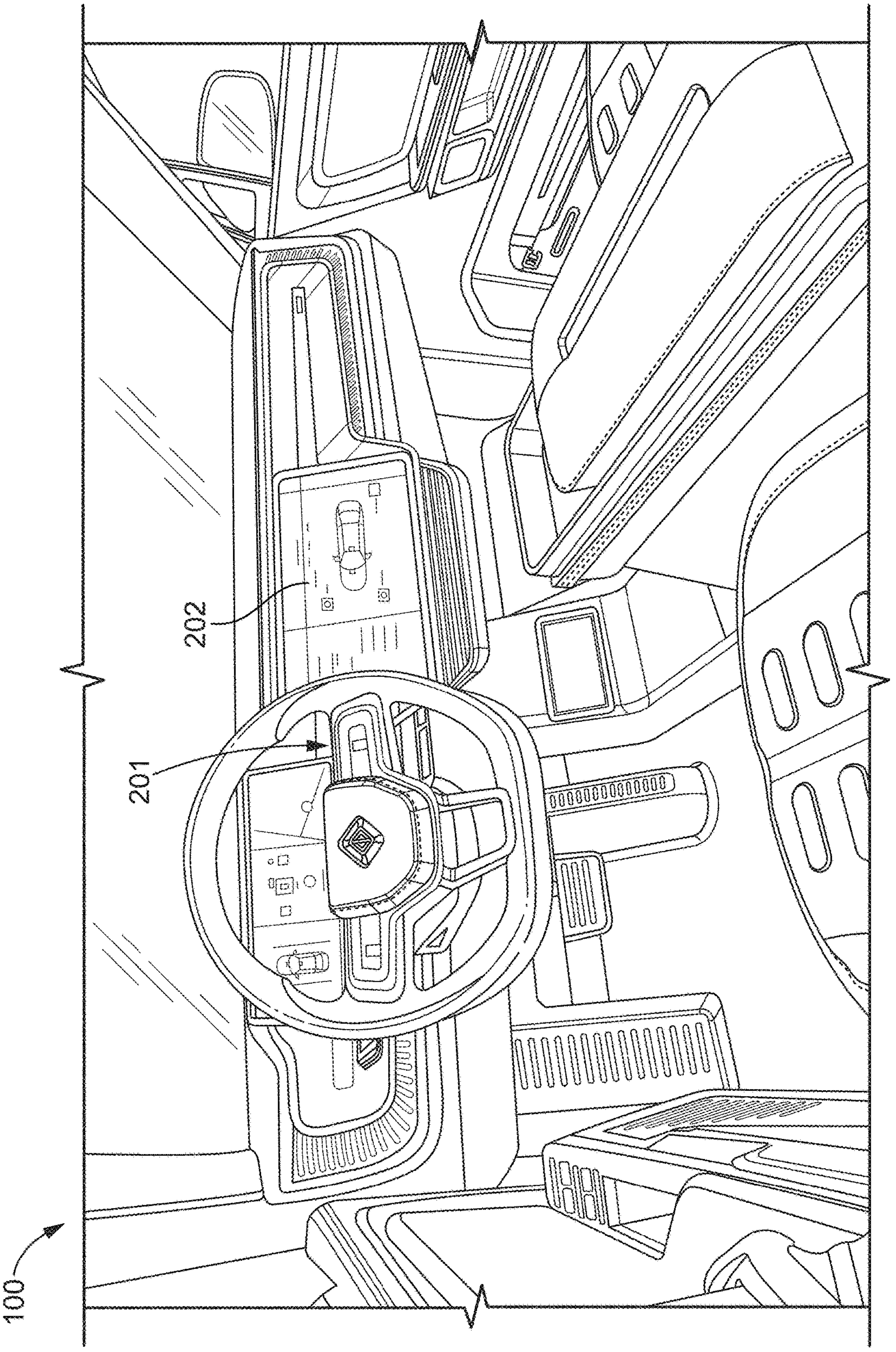
FIG. 2A illustrates an example vehicle interior, in accordance with certain embodiments of the present disclosure.
Figure 2B:
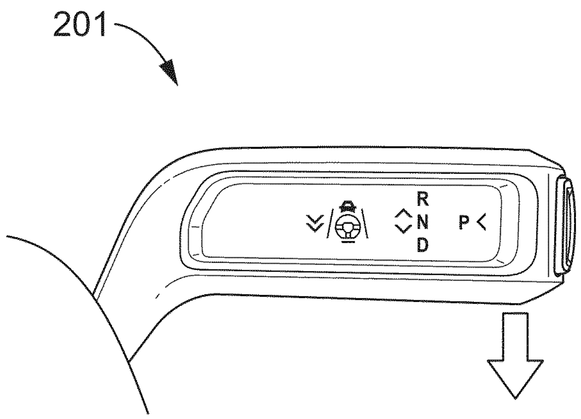
FIG. 2B illustrates an example of an input device proximate a driver, in accordance with certain embodiments of the present disclosure.

FIG. 2A illustrates an example interior of vehicle 100, in accordance with certain embodiments of the present disclosure. FIG. 2B illustrates an example input device in the example interior of FIG. 2A, in accordance with certain embodiments of the present disclosure. FIGS. 2A-B will be described collectively. In the example of FIGS. 2A-B, a drive stalk 201 and an infotainment display 202 are shown.

In certain embodiments, an input device proximate a user (e.g., a driver), such as the drive stalk 201, can be employed by the user to engage a desired ADAS automation level. For example, one user input via the drive stalk 201 (e.g., the user pulling down the drive stalk 201 one time) may be interpreted by the control system 104 as engaging one level of automatic driver assistance, such as ACC. Continuing the same example, two user inputs that satisfy a time constraint relative to each other (e.g., the user pulling down the drive stalk 201 two times within 300 ms, 500 ms, 1 s, etc.) may be interpreted by the control system 104 as engaging a higher level of automatic driver assistance, such as HWA. For simplicity of description, examples will be described herein with respect to the drive stalk 201. It should be appreciated, however, that the principles described herein are similarly applicable to other input mechanisms that may be proximate the driver, including the infotainment display 202 in some cases.

Figure 3:
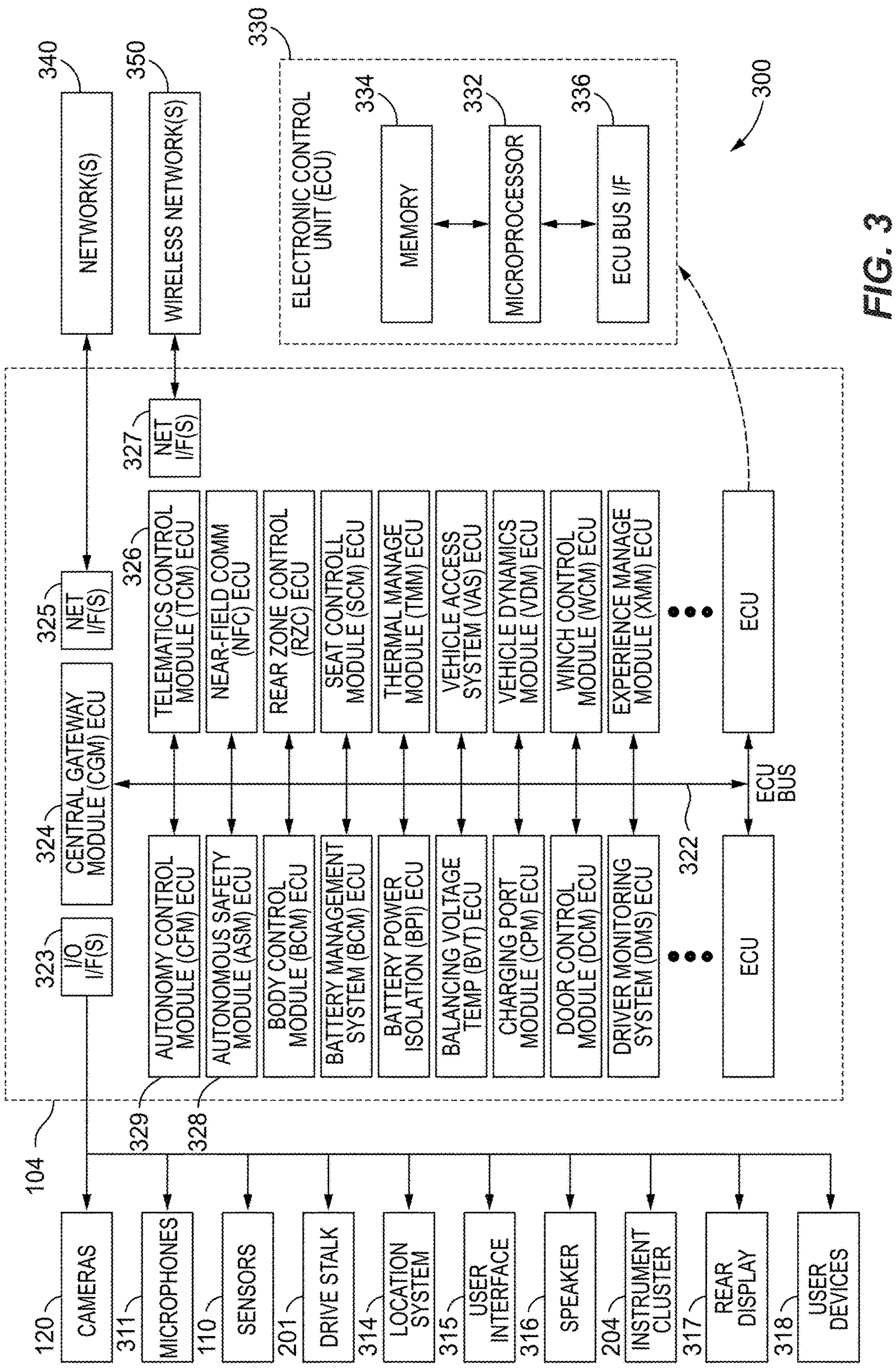
FIG. 3 illustrates a block diagram of example components of a vehicle, in accordance with certain embodiments of the present disclosure.

FIG. 3 illustrates a block diagram 300 of example components of vehicle 100, in accordance with certain embodiments of the present disclosure. As described relative to FIG. 1, vehicle 100 includes control system 104, where control system 104 is configured to perform the functions described relative to FIGS. 1 and 2A-B, as well as other functions for operation of vehicle 100. In many embodiments, control system 104 includes a number of electronic control units (ECUs) 330 coupled to ECU Bus 322. Each ECU 330 performs a particular set of functions, and includes, inter alia, microprocessor 332 coupled to memory 334 and ECU Bus I/F 336. In certain embodiments, control system 104 may include one or more system-on-chips (SOCs). Each SOC may include a number of multi-core processors coupled to a high-speed interconnect and on-chip memory, and may perform a much larger set of functions than a single ECU 330.

Control system 104 is coupled to sensors, input/output (I/O) devices and actuators, as well as other components within a propulsion system, an energy storage system, and/or an accessory system. The sensors may include, for example, cameras 120, microphones 311, sensors 110, location system 314, etc. The I/O devices may include, for example, user interface 315, infotainment display 202, speaker 316, rear display 317, drive stalk 201, user devices 318, etc. The actuators may include, for example, actuators that adjust cameras 120 and/or actuators that implement automatic driver assistance according to an applicable operational mode. Additionally, control system 104 may be coupled to network(s) 340, network(s) 350, etc. In certain embodiments, one or more ECUs 330 may include the necessary interfaces to be coupled directly to particular sensors, I/O devices, actuators and other vehicle system components.

Speaker 316 may be located at any location within the cabin of vehicle 100, e.g., at a dashboard of vehicle 100 and/or on an interior portion of a vehicle door. In some embodiments, speaker 316 may be configured to play audio described herein based on commands, for example, from control system 104. Although speaker 316 is described singly, speaker 316 can be representative of multiple speakers.

In many embodiments, control system 104 includes Central Gateway Module (CGM) ECU 324 which provides a central communications hub for vehicle 100. CGM ECU 324 includes (or is coupled to) I/O interfaces 323 to receive data, send commands, etc., to and from the sensors, I/O devices, actuators and other vehicle system components. CGM ECU 324 also includes (or is coupled to) network interface(s) 325 that provides network connectivity through Controller Area Network (CAN) ports, Local Interconnect Network (LIN) ports, Ethernet ports, etc.

For example, CGM ECU 324 may receive data from cameras 120, microphones 311, sensors 110, drive stalk 201 and location system 314, as well as user interface 315, and then communicate the data over ECU Bus 322 to the appropriate ECU 330. Similarly, CGM ECU 324 may receive commands and data from the ECUs 330 and send them to the appropriate I/O devices, actuators and vehicle components. For example, a GUI widget may be sent to user interface 315 (e.g., infotainment display 202, rear display 317, and/or user devices 318), and video data from cameras 120 may be sent to infotainment display 202, rear display 317, user devices 318 etc.

In many embodiments, control system 104 includes Telematics Control Module (TCM) ECU 326 which provides a vehicle communication gateway for vehicle 100. TCM ECU 326 includes (or is coupled to) network interface (s) 327 that provides network connectivity to support functionality such as over-the-air (OTA) software updates, communication between the vehicle and the internet, communication between the vehicle and a computing device, in-vehicle navigation, vehicle-to-vehicle communication, communication between the vehicle and landscape features (e.g., automated toll road sensors, automated toll gates, power dispensers at charging stations), automated calling functionality, etc.

In many embodiments, control system 104 also includes, inter alia, Autonomy Control Module (ACM) ECU, Autonomous Safety Module (ASM) ECU, Body Control Module (BCM) ECU, Battery Management System (BMS) ECU, Battery Power Isolation (BPI) ECU, Balancing Voltage Temperature (BVT) ECU, Door Control Module (DCM) ECU, Driver Monitoring System (DMS) ECU, Near-Field Communication (NFC) ECU, Rear Zone Control (RZC) ECU, Seat Control Module (SCM) ECU, Thermal Management Module (TMM) ECU, Vehicle Access System (VAS)

ECU, Vehicle Dynamics Module (VDM) ECU, Winch Control Module (WCM) ECU, an Experience Management Module (XMM) ECU, etc.

In some embodiments, ASM ECU 328 and/or another of the ECUs 330 may provide functions to support driving safety by monitoring sensors 110 and/or cameras 120. In various embodiments, ASM ECU 328 may be configured to identify vehicles or other objects in the images captured by cameras 120 using any suitable image recognition technique. In some cases, object proximity to vehicle 100 may be estimated based on an object detection representation. In addition, or alternatively, ASM ECU 328 can identify a presence of a vehicle or other object in a blind spot based on an output from one of the sensors 110, or based on a combination of such outputs.

In certain embodiments, ASM ECU 328 may be configured to generate a notification of a safety condition, such as a notification indicative of a presence of a vehicle or other object relative to a portion of vehicle 100. The safety notification may indicate, for example, the portion of the vehicle 100, such as the driver side, passenger side, front, rear, etc. In certain embodiments, the portion of the vehicle may correspond to a blind spot, for example, on the driver side or passenger side of vehicle 100.

In some embodiments, the ACM ECU 329 and/or other of the ECUs may provide functions to cause the user to be audibly alerted, via speaker 316, based on a current operational mode related to vehicle 100. In certain embodiments, the memory 334 of the ACM ECU 329, or other memory, can maintain audio files with predefined time relationships relative to each other. In various embodiments, the predefined time relationships enable the ACM ECU 329 to gracefully splice together two or more of the audio files to form substantially continuous audio feedback to the user.

For example, in response to receiving a first event associated with a first operational mode, the ACM ECU 239 can trigger playback of a first audio file indicative of that mode. If a second event is received that satisfies a time constraint relative to the first event (e.g., within 300 ms, 500 ms, 1 s, etc.), the ACM ECU 329 can dynamically cause playback to switch to a second audio file based on a predefined time relationship between the two files. According to this example, a played portion of the first audio file and a played portion of the second audio file can together form substantially continuous audio feedback indicative of the second operational mode. Examples will be described in greater detail relative to FIGS. 5-12.

Figure 4A:
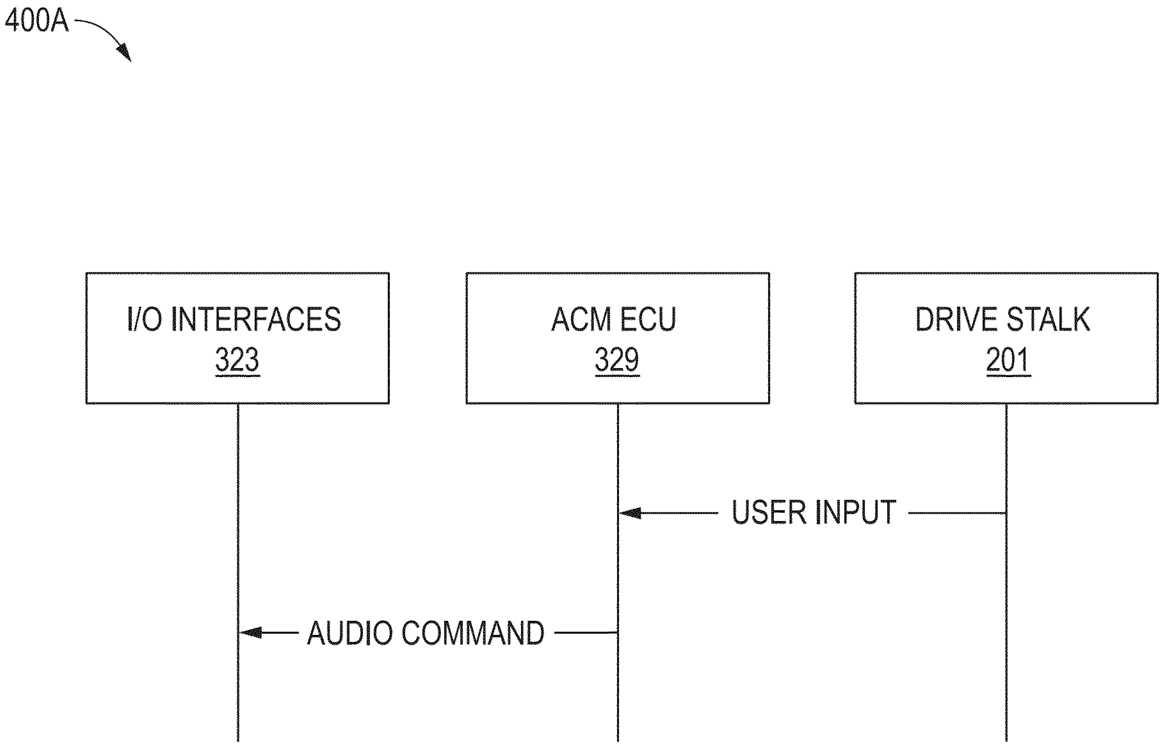
FIG. 4A illustrates an example of a sequence diagram for audibly alerting a user of a vehicle in response to user engagement of an operational mode, in accordance with certain embodiments of the present disclosure.

FIG. 4A illustrates an example of a sequence diagram 400A for audibly alerting the user of vehicle 100 in response to user engagement of an operational mode, in accordance with certain embodiments of the present disclosure. Generally, the sequence diagram 400A depicts the I/O interfaces 323, the ACM ECU 329, and the drive stalk 201.

In the example of FIG. 4A, the drive stalk 201 produces a user input, for example, in response to a user action relative thereto (e.g., a pulldown as described relative to FIGS. 2A-B). The user input may be associated with an operational mode related to vehicle 100, such as an ADAS automation level. For example, if the user input satisfies a time constraint relative to a previously received user input (e.g., within 300 ms, 500 ms, 1 s, etc.), the associated operational mode may be HWA. Continuing the example, if the user input does not satisfy a time constraint relative to any previously received user input, the associated operational mode may be ACC.

The ACM ECU 329 may receive the user input and, based thereon, issue an audio command via the I/O interfaces 232. The audio command may cause substantially continuous audio feedback indicative of the associated operational mode to be output to the speaker 316 discussed relative to FIG. 3. As discussed above relative to FIG. 3, such playback can involve playing one audio file and/or gracefully splicing together multiple audio files for playback. Examples of the substantially continuous audio feedback will be described in greater detail relative to FIGS. 5-12.

Figure 4B:
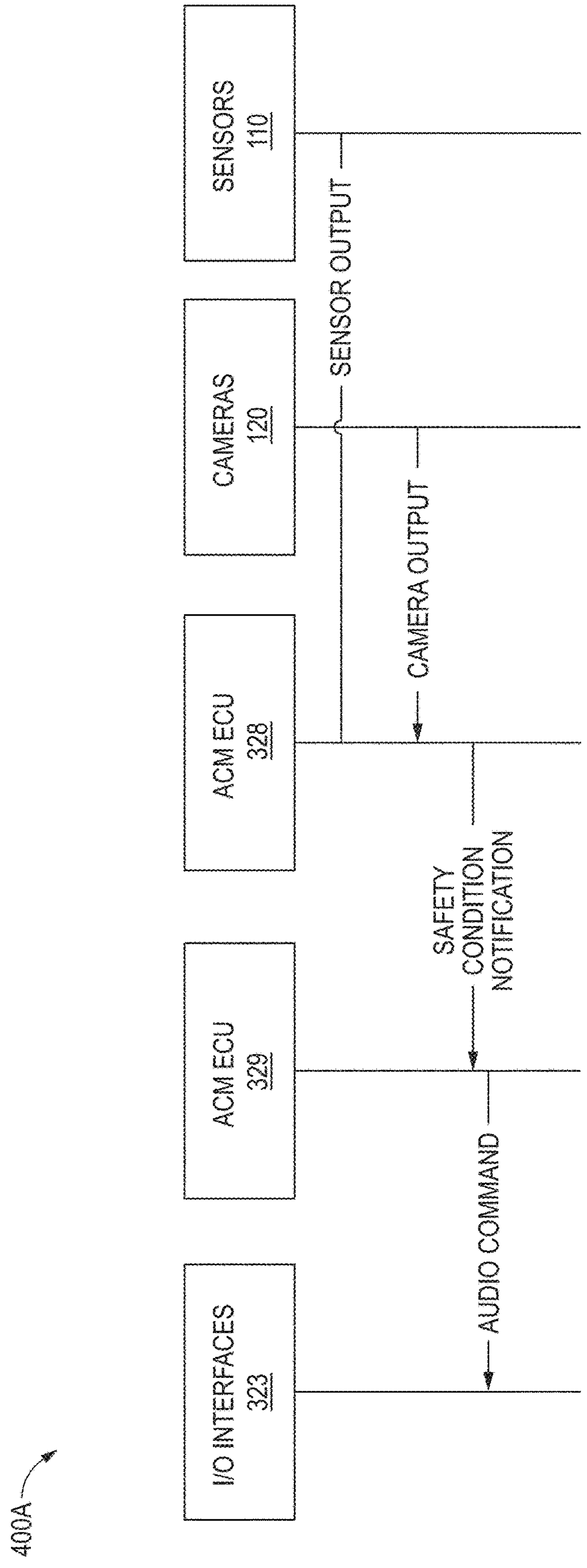
FIG. 4B illustrates an example of a sequence diagram for audibly alerting a user of a vehicle in response to automated notifications of safety conditions, in accordance with certain embodiments of the present disclosure.

FIG. 4B illustrates an example of a sequence diagram 400B for audibly alerting the user of vehicle 100 in response to automated notifications of safety conditions, in accordance with certain embodiments of the present disclosure. Generally, the sequence diagram 400B depicts the I/O interfaces 323, the ACM ECU 329, the ASM ECU 328, the cameras 120, and the sensors 110.

The ASM ECU 328 may receive a sensor output from one or more of the sensors 110 and/or a camera output from one or more of the cameras 120. As described relative to FIG. 3, the ASM ECU 328 may generate, based on the sensor output and/or the camera output, an automated notification of a safety condition, such as a notification indicating a presence of a vehicle or other object relative to a portion of vehicle 100.

The notification of the safety condition may be associated with an operational mode related to vehicle 100, such as an ADAS alerting level. For example, if the notification satisfies a time constraint relative to a previously received safety condition notification (e.g., within 300 ms, 500 ms, 1 s, etc.), the associated operational mode may be a second or more severe alerting level. Continuing the example, if the notification does not satisfy a time constraint relative to any previously received safety condition notification, the associated operational mode may be a first or initial alerting level.

The ACM ECU 329 may receive the notification of the safety condition and, based thereon, issue an audio command via the I/O interfaces 323. The audio command may cause substantially continuous audio feedback indicative of the associated operational mode to be output to the speaker 316 discussed relative to FIG. 3. As discussed above relative to FIG. 3, such playback can involve playing one audio file and/or gracefully splicing together multiple audio files for playback. Examples of the substantially continuous audio feedback will be described in greater detail relative to FIGS. 5-12.

FIGS. 5-11 illustrate examples of audible alerting based on ADAS automation levels, in accordance with certain embodiments of the present disclosure. In general, the ADAS automation levels progressively increase in the amount of automatic driver assistance provided in vehicle 100. Although the ADAS automation levels can include any number of levels and/or types of automation, for simplicity of description, in the example of FIGS. 5-11, the automation levels are described as including ACC and HWA.

Figure 5:
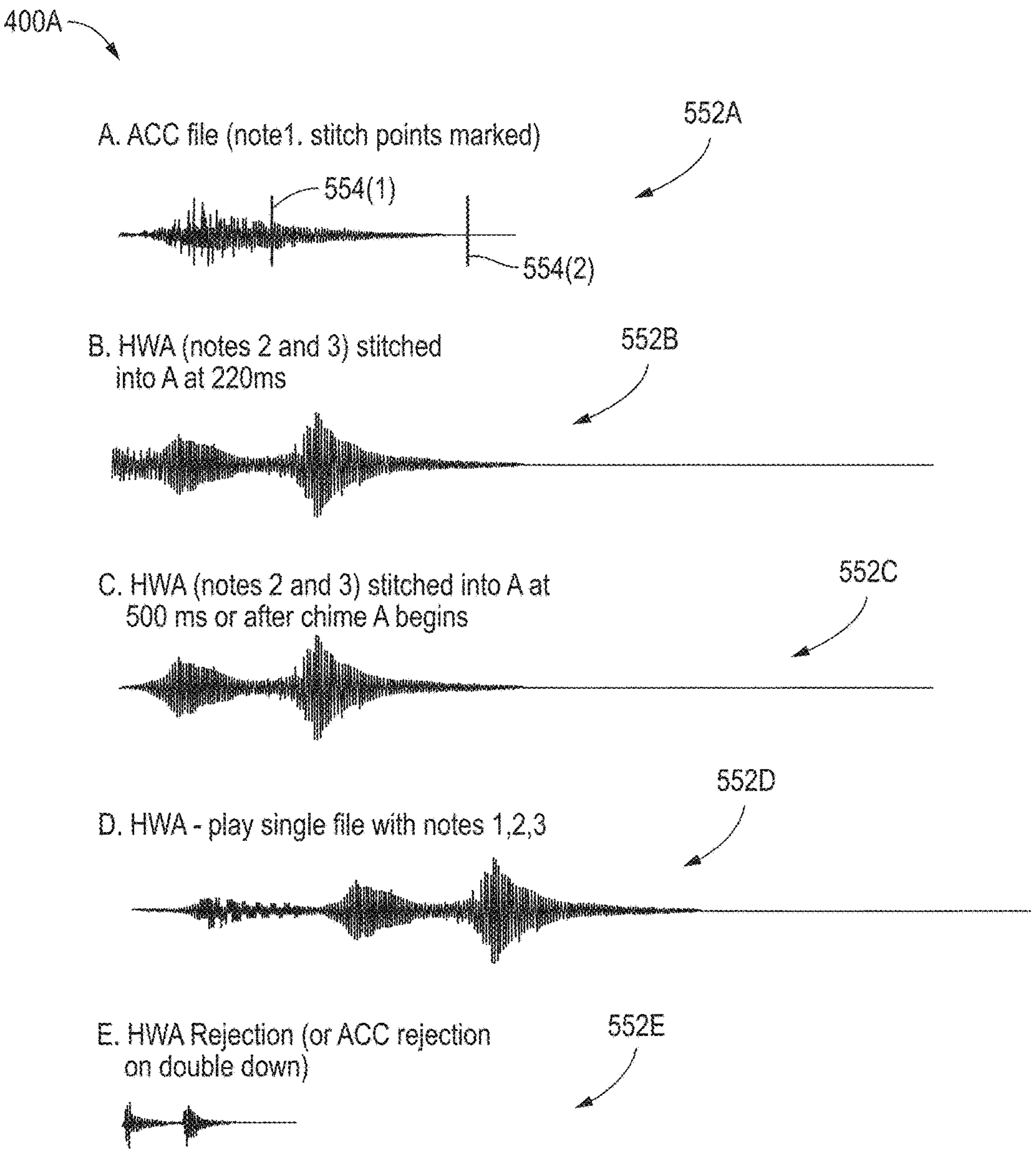
FIG. 5 illustrates an example of audio files that can be utilized for audibly alerting the user of vehicle, in accordance with certain embodiments of the present disclosure.

FIG. 5 illustrates an example of audio files 552 that can be utilized for audibly alerting the user of vehicle 100, according to certain embodiments of the present disclosure. In various embodiments, the audio files 552 can be maintained in the memory 334 of the ACM ECU 329, for example, as discussed relative to FIG. 3.

In the example of FIG. 5, the audio files 552 include five audio files, namely, audio files 552A-E. It should be appreciated that the audio files 552 can include any suitable number of audio files for a given implementation. As described in greater detail below, some of the audio files 552 can have predefined time relationships with each other to facilitate graceful splicing thereof for substantially continuous audio feedback.

The audio file 552A defines an audio segment indicative of ACC. The audio file 552A can include, for example, one or more chimes, notes, chirps, alarms, beeps, short phrases, and/or other sounds. In certain embodiments, the audio file 552A, if played to completion (e.g., via the speaker 316 of FIG. 3), is substantially continuous audio that indicates to the user of vehicle 100 that ACC is engaged.

The audio file 552A includes two predefined termination points, namely, a termination point 554(1) and a termination point 554(2). The termination points 554(1) and 554(2) can be maintained with the audio file 552A, for example, in the memory 334 of the ACM ECU 529 or in other memory. In the example of FIG. 5, the termination point 554(1) corresponds to approximately 200 ms into the audio file 552A, while the termination point 554(2) corresponds to a range covering approximately 500 ms to an end of the audio file 552A.

The audio files 552B and 552C are audio segments associated with HWA that have predefined time relationships with the audio file 552A. In particular, the audio file 552B has a predefined time relationship with the audio file 552A based on the termination point 554(1). According to the example of FIG. 5, if playback of the audio file 552A is stopped at the termination point 554(1) and, substantially simultaneously, playback of the audio file 552B is triggered, then substantially continuous audio feedback indicative of HWA (i.e., that HWA is engaged) is played to the user, for example, via the speaker 316 of FIG. 3. In this way, the audio file 552A and the audio file 552B are configured to be gracefully spliced together based on the termination point 554(1). For example, the substantially continuous audio indicative of HWA can be a sequence of sounds (e.g., chimes or notes), with the audio file 552A to the termination point 554(1) including a first portion (e.g., a first sound) of the sequence and the audio file 552B including a second portion (e.g., second and third sounds) of the sequence.

In similar fashion, the audio file 552C has a predefined time relationship with the audio file 552A based on the termination point 554(2). According to the example of FIG. 5, if playback of the audio file 552A is stopped at the termination point 554(2) (e.g., 500 ms into playback or thereafter) and, substantially simultaneously, playback of the audio file 552B is triggered, then substantially continuous audio feedback indicative of HWA is played to the user, for example, via the speaker 316 of FIG. 3. In this way, the audio file 552A and the audio file 552C are configured to be gracefully spliced together based on the termination point 554(2). For example, the substantially continuous audio indicative of HWA can be a sequence of sounds (e.g., chimes or notes), with the audio file 552A to the termination point 554(2) including a first portion (e.g., a first sound) of the sequence and the audio file 552C including a second portion (e.g., second and third sounds) of the sequence.

The audio file 552D defines an audio segment indicative of HWA. The audio file 552D can include, for example, one or more chimes, notes, chirps, alarms, beeps, short phrases, and/or other sounds. In certain embodiments, the audio file 552D, if played to completion (e.g., via the speaker 316), is substantially continuous audio that indicates to the user of vehicle 100 that HWA is engaged.

The audio file 552E defines an audio segment indicative of rejection of ACC and/or HWA. The audio file 552E can include, for example, one or more chimes, notes, chirps, alarms, beeps, short phrases, and/or other sounds that indicate that ACC and/or HWA is not engaged following a user attempt to engage the same (e.g., via the drive stalk 210 of FIGS. 2A-B).

Figure 6:
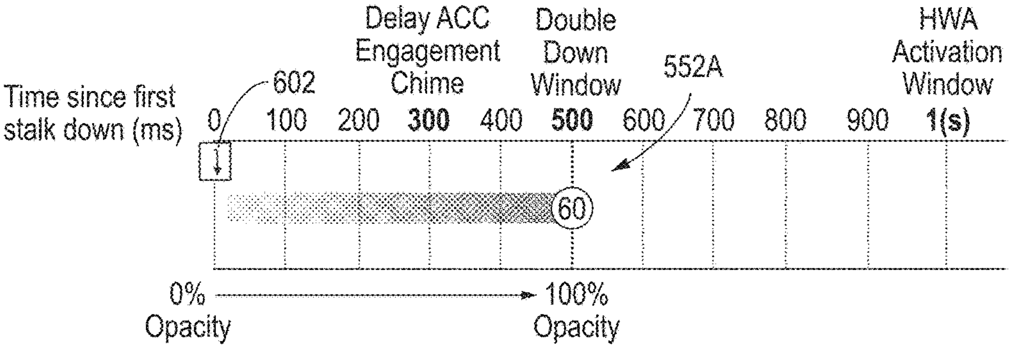
FIG. 6 illustrates an example of faded-in playback of an audio file, in accordance with certain embodiments of the present disclosure.

FIG. 6 illustrates an example of faded-in playback of the audio file 552A. As discussed previously, the audio file 552A defines an audio segment indicative of ACC. In the example of FIG. 6, playback of the audio file 552A is triggered a predefined time duration after receipt of user input 602 (e.g., 0 ms, 300 ms, etc.). The user input 602 may be received, for example, via an input device proximate the user, such as the drive stalk 201 discussed above relative to FIGS. 2A-B and 4A. In the example of FIG. 6, once playback has been triggered, the audio file 552A can be gradually faded in over a period (e.g., over a period of 200 ms, 500 ms, etc.). In various embodiments, the fading in of the audio file 552A facilitates other audio files to be gracefully spliced together with audio file 552A, as needed.

FIGS. 7-11 illustrate operational examples utilizing the audio files 552 of FIG. 5, in accordance with certain embodiments of the present disclosure. For purposes of FIGS. 7-11, user inputs may be received via an input device proximate the user (e.g., driver) of vehicle 100, such as via the drive stalk 201 described relative to FIGS. 2A-B and 4A. As applicable, playback of the audio files 552 (e.g., on the speaker 316) can be started or terminated, for example, by issuing an audio command as discussed relative to FIG. 4A.

Table 1 illustrates example parameters and values that are utilized in the operational examples of FIGS. 7-11. In Table 1, a predefined time duration corresponds to a period of delay, following a first user input, before audio playback is triggered. The period of delay may be zero in some cases, although it is nonzero for purposes of the example of FIGS. 7-11. Also in Table 1, a time constraint corresponds to a window, following the first user input, during which HWA may become engaged due to a second user input.

TABLE 1

| EXAMPLE PARAMETER | EXAMPLE VALUE |
|---|---|
| PREDEFINED TIME DURATION | 300 ms |
| TIME CONSTRAINT | 1 s |

Figure 7:
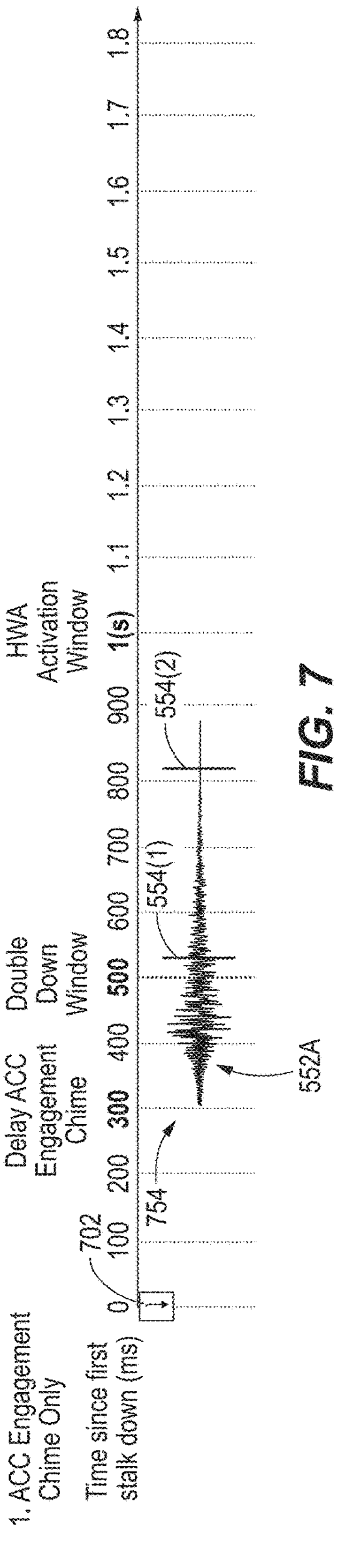
FIG. 7 illustrates an example of audibly alerting for ACC engagement, in accordance with to certain embodiments of the present disclosure.

FIG. 7 illustrates an example of audibly alerting for ACC engagement, according to certain embodiments of the present disclosure. In the example of FIG. 7, a user input 702 is received. The user input 702 is the first user input and, accordingly, is associated with ACC. Since no additional user inputs are received within the predefined time duration after the user input 702 (e.g., within 300 ms following the user input 702), playback of the audio file 552A, for example, on the speaker 316, is triggered at that time (e.g., at 300 ms). Furthermore, since no additional user inputs are received in satisfaction of the time constraint (e.g., within 1 s following the user input 702), the audio file 552A is played to completion without being terminated at the termination point 554(1) or the termination point 554(2). Therefore, in the example of FIG. 7, substantially continuous audio feedback 754 indicative of ACC engagement is played to the user, for example, via the speaker 316 of FIG. 3. As illustrated, the substantially continuous audio feedback 754 includes all or substantially all of the audio file 552A.

Figure 8:
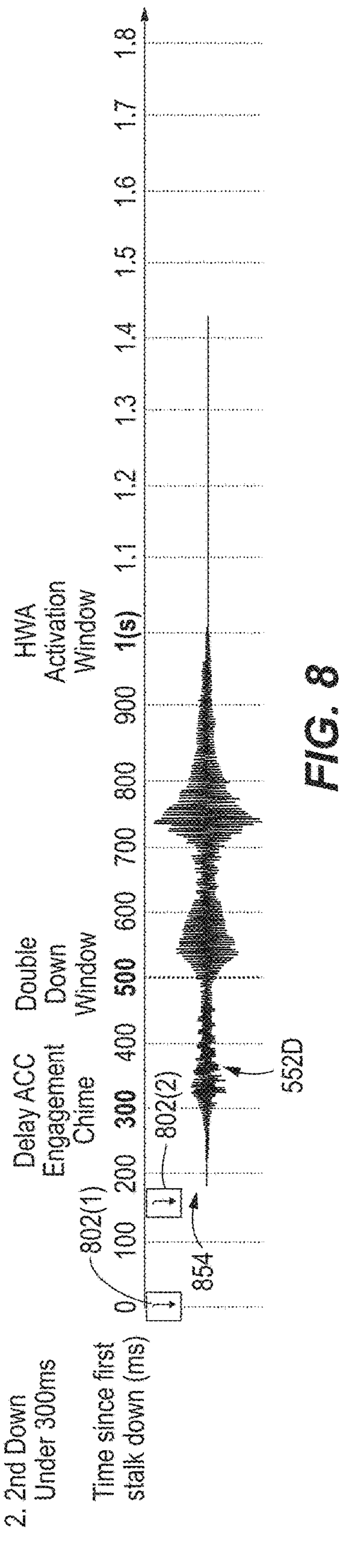
FIG. 8 illustrates an example of audibly alerting for HWA engagement, in accordance with certain embodiments of the present disclosure.

FIG. 8 illustrates an example of audibly alerting for HWA engagement, according to certain embodiments of the present disclosure. In the example of FIG. 8, a user input 802(1) is received. The user input 802(1) is the first user input and, accordingly, is associated with ACC. During the predetermined time duration after the user input 802(1) (e.g., within 300 ms of the user input 802(1)), a user input 802(2) is received. The user input 802(2) is the second user input and satisfies the time constraint relative to the user input 802(1). In response, the user input 802(2) is associated with HWA and playback of the audio file 552D, for example, on the speaker 316 of FIG. 3, is triggered.

Still with reference to FIG. 8, the receipt of the user input 802(2) resolves the question of whether a second user input will be received. As such, in various embodiments, the audible alerting can be optimized by not waiting the remainder of the predefined time duration. Instead, as illustrated, the playback of the audio file 552D can be triggered substantially immediately after receipt of the user input 802(2), with the audio file 552D being played to completion. Therefore, in the example of FIG. 8, substantially continuous audio feedback 854 indicative of HWA engagement is played to the user, for example, via the speaker 316 of FIG. 3. As illustrated, the substantially continuous audio feedback 854 can include all or substantially all of the audio file 552D.

Figure 9:
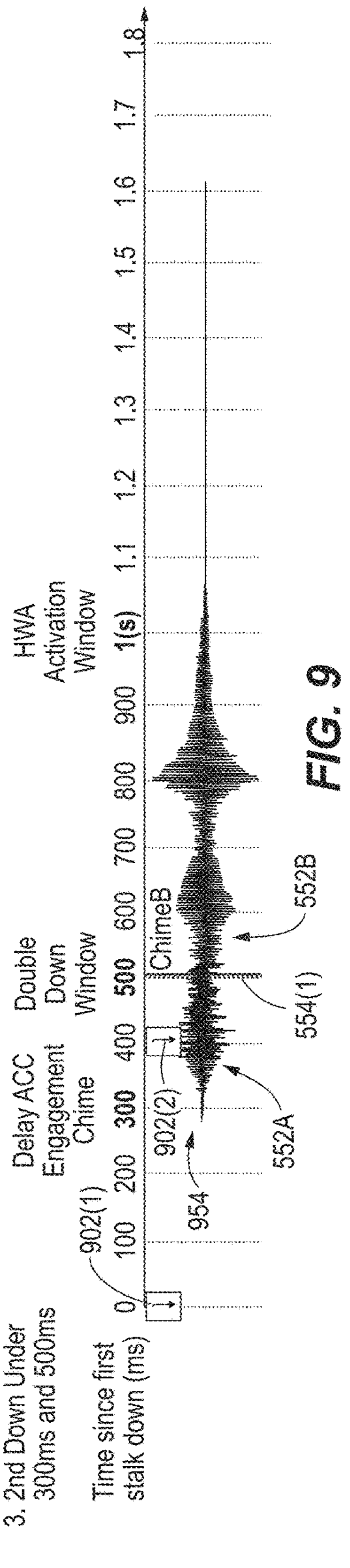
FIG. 9 illustrates another example of audibly alerting for HWA engagement, in accordance with certain embodiments of the present disclosure.

FIG. 9 illustrates another example of audibly alerting for HWA engagement, according to certain embodiments of the present disclosure. In the example of FIG. 9, a user input 902(1) is received. The user input 902(1) is the first user input and, accordingly, is associated with ACC. No additional user inputs are received within the predefined time duration after the user input 902(1). Therefore, upon expiration of the predefined time duration, playback of the audio file 552A is triggered (e.g., via the speaker 316 of FIG. 3).

Still with reference to FIG. 9, during the playback of the audio file 552A, a user input 902(2) is received. The user input 902(2) is the second user input and satisfies the time constraint relative to the user input 902(1). In response, the user input 902(2) is associated with HWA and playback of the audio file 552B is triggered (e.g., via the speaker 316 of FIG. 3). In particular, the playback of the audio file 552B is triggered approximately 220 ms into the playback of the audio file 552A in correspondence to the termination point 554(1). According to the example of FIG. 9, the termination point 554(1) represents the earliest available termination point at the time of receiving the user input 902(2). The triggering can include, for example, terminating the audio file 552A at the termination point 554(1) and, substantially simultaneously, starting the audio file 552B, with the audio file 552B being played to completion. Therefore, in the example of FIG. 9, substantially continuous audio feedback 954 indicative of HWA engagement is played to the user via, for example, the speaker 316 of FIG. 3. As illustrated, the substantially continuous audio feedback 954 includes a portion of the audio file 552A (e.g., from a beginning until the termination point 554(1)) and all or substantially all of the audio file 552B.

Figure 10:
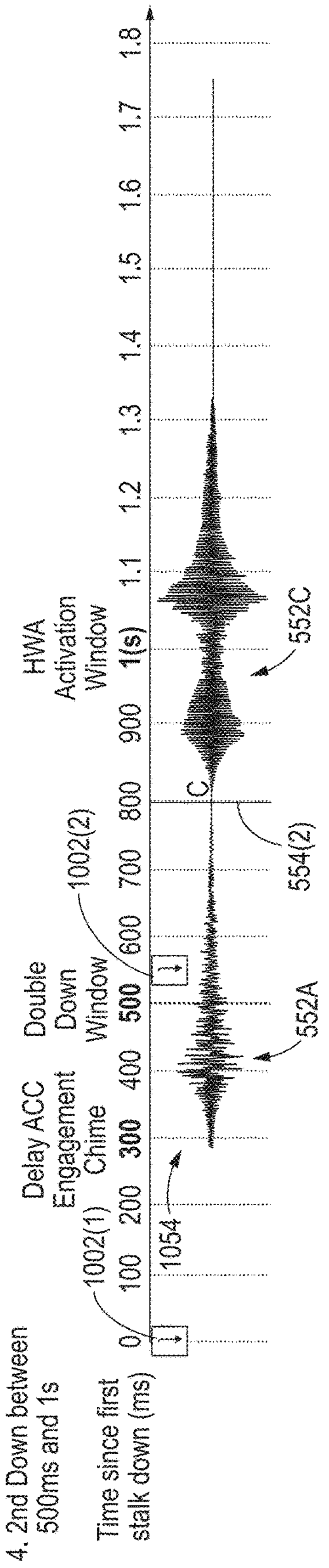
FIG. 10 illustrates another example of audibly alerting for HWA engagement, in accordance with certain embodiments of the present disclosure.

FIG. 10 illustrates another example of audibly alerting for HWA engagement, according to certain embodiments of the present disclosure. In the example of FIG. 10, a user input 1002(1) is received. The user input 1002(1) is the first user input and, accordingly, is associated with ACC. No additional user inputs are received within the predefined time duration after the user input 1002(1). Therefore, upon expiration of the predefined time duration, playback of the audio file 552A is triggered (e.g., via the speaker 316 of FIG. 3).

Still with reference to FIG. 10, during the playback of the audio file 552A, a user input 1002(2) is received. The user input 1002(2) is the second user input and satisfies the time constraint relative to the user input 1002(1). In response, the user input 1002(2) is associated with HWA and playback of the audio file 552C is triggered (e.g., via the speaker 316 of FIG. 3). In particular, the playback of the audio file 552C is triggered 500 ms or more into the playback of the audio file 552A in correspondence to the termination point 554(2). According to the example of FIG. 10, the termination point 554(2) is the earliest available termination point at the time of receiving the user input 1002(2). The triggering can include, for example, terminating the audio file 552A at the termination point 554(1) and, substantially simultaneously, starting the audio file 552C, with the audio file 552C being played to completion. Therefore, in the example of FIG. 10, substantially continuous audio feedback 1054 indicative of HWA engagement is played to the user via, for example, the speaker 316 of FIG. 3. As illustrated, the substantially continuous audio feedback 1054 includes a portion of the audio file 552A (i.e., from a beginning until the termination point 554(2)) and all or substantially all of the audio file 552C.

Figure 11:
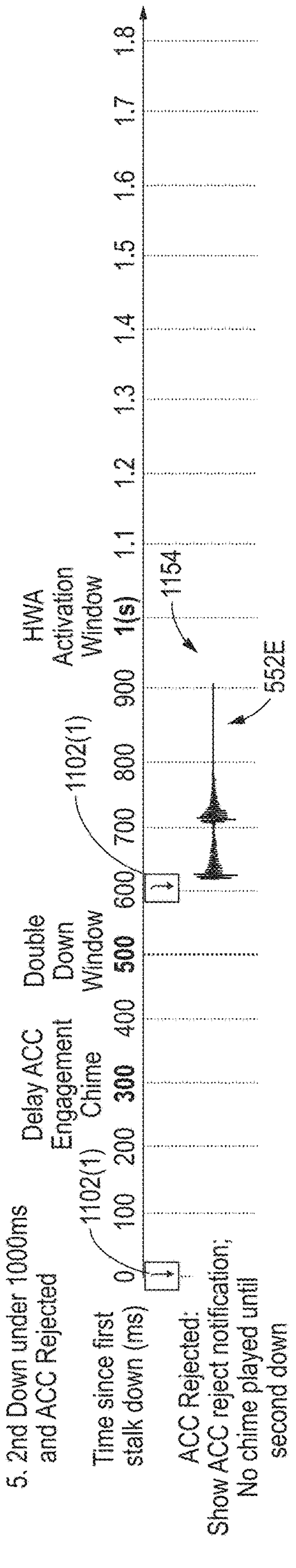
FIG. 11 illustrates an example of audibly alerting for rejection of ACC and/or HWA, in accordance with certain embodiments of the present disclosure.

FIG. 11 illustrates an example of audibly alerting for rejection of ACC and/or HWA, according to certain embodiments of the present disclosure. In the example of FIG. 11, a user input 1102(1) is received. The user input 1102(1) is the first user input and, accordingly, is associated with ACC. However, in the example of FIG. 11, ACC is rejected, for example, due to a state of the vehicle (e.g., vehicle 100 may be traveling below a threshold speed). According to this example, no playback is triggered in response to the user input 1102(1).

Still with reference to FIG. 11, a user input 1102(2) is received at approximately 600 ms following the user input 1102(1). The user input 1002(2) is the second user input and satisfies the time constraint relative to the user input 1102(1). However, HWA, like ACC, is rejected due to the state of the vehicle, in response to which playback of the audio file 552E is triggered (e.g., via the speaker 316 of FIG. 3). Therefore, in the example of FIG. 11, substantially continuous audio feedback 1154 indicative of HWA rejection is played to the user via, for example, the speaker 316 of FIG. 3. As illustrated, the substantially continuous audio feedback 1154 includes all or substantially all of the audio file 552E.

Figure 12:
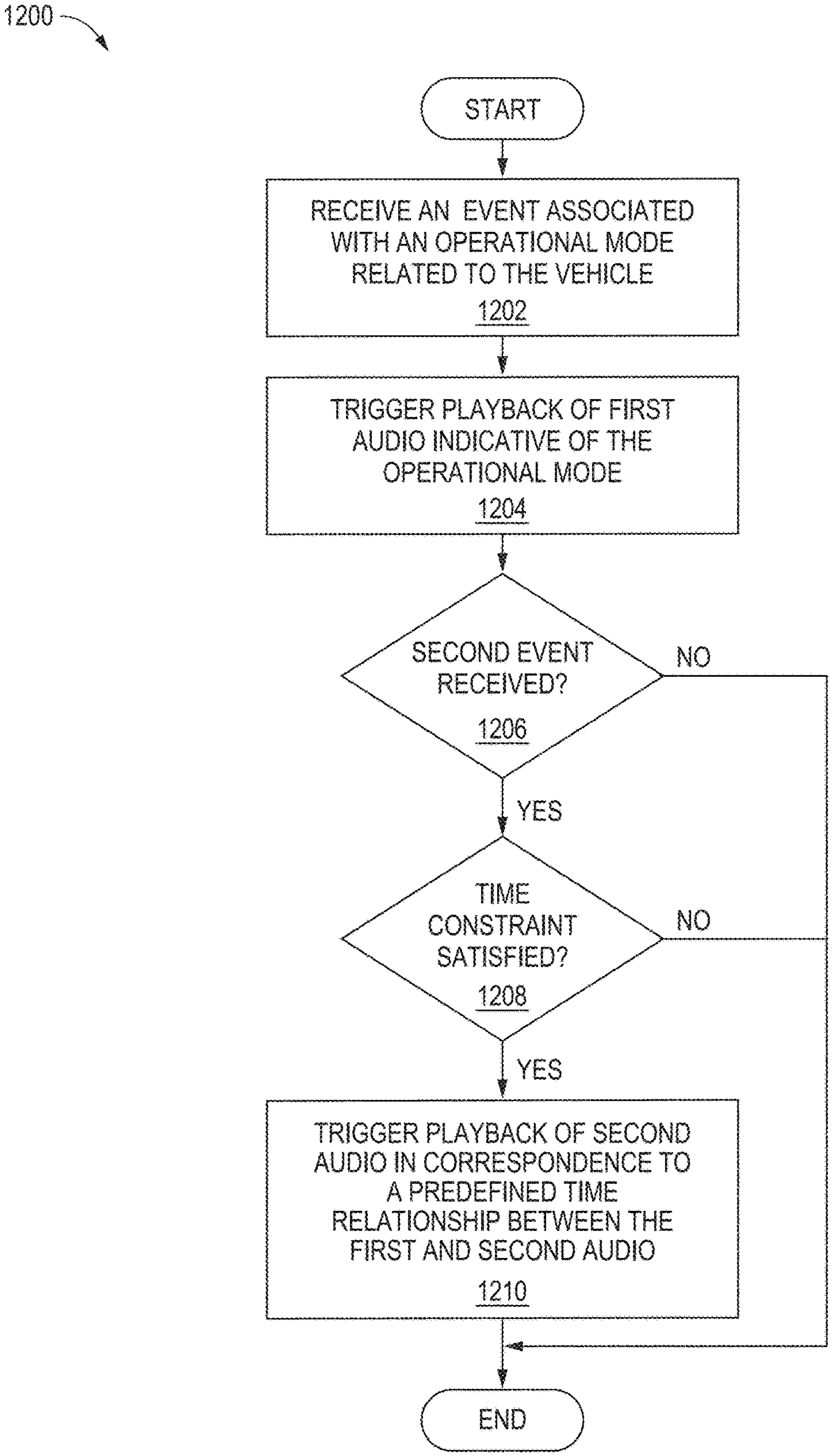
FIG. 12 illustrates an example of a process for audibly alerting a user, in accordance with certain embodiments of the present disclosure.

FIG. 12 illustrates an example of a process 1200 for audibly alerting a user, in accordance with certain embodiments of the present disclosure. In certain embodiments, the process 1200 can be implemented by any vehicle system that can process data. Although any number of systems, in whole or in part, can implement the process 1200, to simplify discussion, the process 1200 will be described in relation to the control system 104 of vehicle 100 as described relative to FIGS. 1-3.

At block 1202, the control system 104 receives a first event associated with an operational mode related to vehicle 100. In various embodiments, the first event can be, for example, a user input, a notification of safety condition related to vehicle 100, and/or the like. In some cases, as discussed previously, the first event can be associated with a first automation level in a progression of ADAS automation levels, such as ACC. In addition, or alternatively, in some cases, the first event can be associated with a first alerting level in a progression of alerting levels that increase in severity and/or urgency.

At block 1204, the control system 104 triggers playback of first audio indicative of the operational mode associated with the first event. The triggering can include outputting the playback, for example, to the speaker 316 of FIG. 3 (e.g., via an audio command as discussed relative to FIG. 4A). The first audio can be similar, for example, to the audio file 552A of FIG. 5. In some cases, the control system 104 can trigger the playback a predefined time duration after the receipt of the first event, as discussed previously, so as to allow time for a second event before any audio playback is triggered. In some cases, the predefined time duration can be zero, such that the playback of the first audio is triggered immediately upon the receipt of the first event. In certain embodiments, the block 1204 can include the control system 104 fading in the first audio as described relative to FIG. 6.

At decision block 1206, the control system 104 determines whether a second event has been received. If no second event has been received, the process 1200 ends. Otherwise, if it is determined, at the decision block 1206, that a second event has been received, at decision block 1208, the control system 104 determines whether the second event satisfies the time constraint relative to the first event (i.e., whether elapsed time since the first event is less than or equal to than the time constraint). If the second event does not satisfy the time constraint, the process 1200 ends. Otherwise, if it is determined, at the decision block 1208, that the second event satisfies the time constraint relative to the first event, at block 1210, the control system 104 triggers playback of second audio in correspondence to a predefined time relationship between the first audio and the second audio. As with the first audio, the playback of the second audio can be output, for example, to the speaker 316 of FIG. 3 (e.g., via an audio command as discussed relative to FIG. 4A). An example of the triggering at the block 1210 will be described in greater detail relative to FIG. 13. After block 1210, the process 1200 ends.

Figure 13:
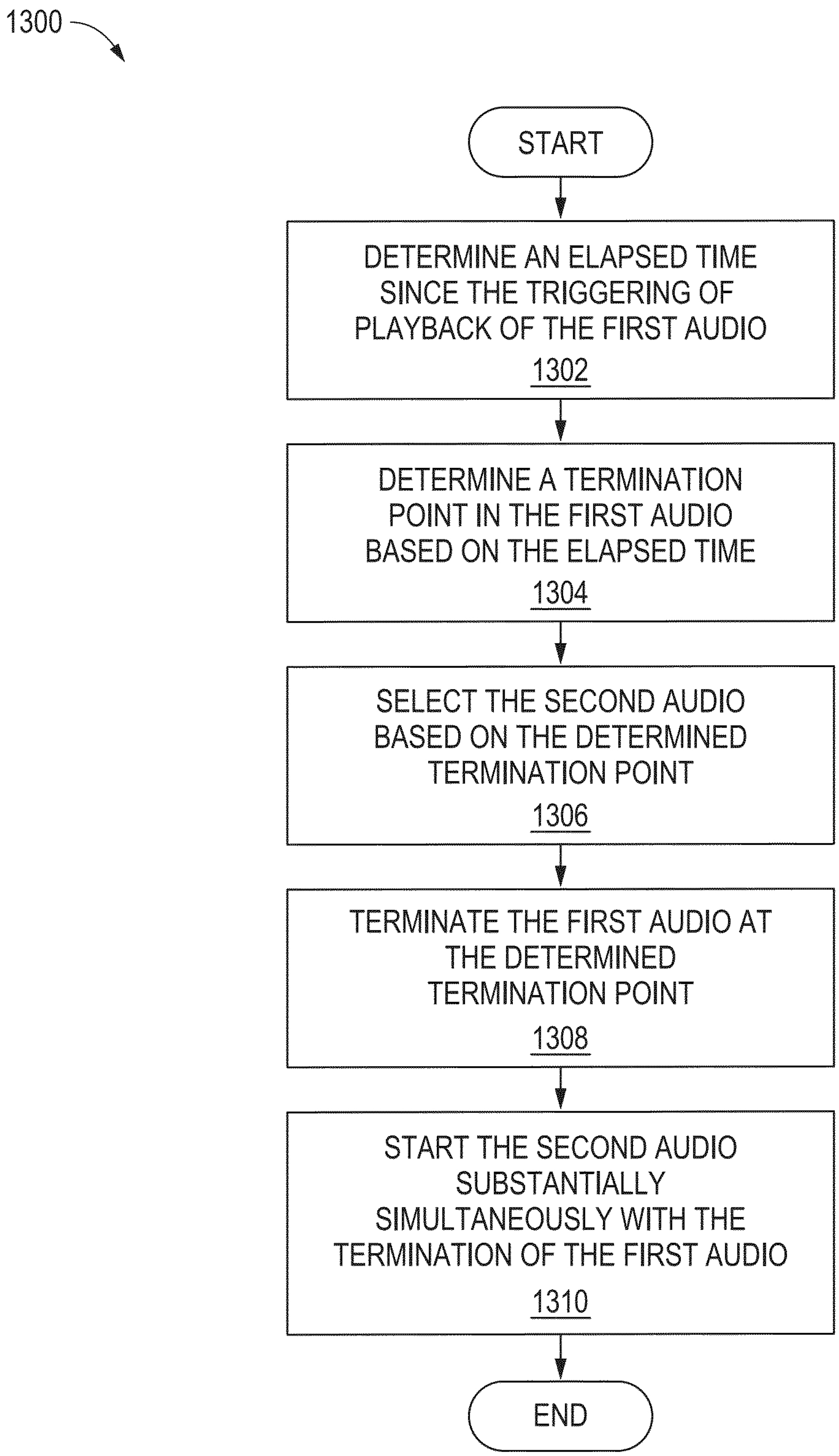
FIG. 13 illustrates an example of a process for triggering playback of second audio after first audio has already been triggered, in accordance with certain embodiments of the present disclosure.

FIG. 13 illustrates an example of a process 1300 for triggering playback of second audio after first audio has already been triggered, in accordance with certain embodiments of the present disclosure. In certain embodiments, the process 1300 can be performed as all or part of the block 1210 of FIG. 12. In certain embodiments, the process 1300 can be implemented by any vehicle system that can process data. Although any number of systems, in whole or in part, can implement the process 1300, to simplify discussion, the process 1300 will be described in relation to the control system 104 of vehicle 100 as described relative to FIGS. 1-3.

At block 1302, the control system 104 determines an elapsed time since the triggering of playback of first audio, for example, at the block 1204 of FIG. 12. At block 1304, the control system 104 determines a termination point in the first audio based on the elapsed time. As described relative to FIGS. 9-10, in some cases, the determined termination point can be the earliest available termination point that has not already been passed in the playback of the first audio.

At block 1306, the control system 104 selects the second audio from a plurality of audio options (e.g., from a plurality of audio files) based on the determined termination point, for example, as described relative to FIGS. 5-11. In various embodiments, blocks 1308 and 1310 can execute substantially simultaneously in response to the block 1306. At block 1308, the control system 104 terminates the first audio at the determined termination point. At block 1310, the control system 104 starts the second audio substantially simultaneously with the termination of the first audio. After block 1310, the process 1300 ends.

The many features and advantages of the disclosure are apparent from the detailed specification, and, thus, it is intended by the appended claims to cover all such features and advantages of the disclosure which fall within the scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A method of audibly alerting a user of a vehicle, the method comprising:

receiving, in a vehicle control system, a first event associated with a first operational mode related to the vehicle;

responsive to the first event, triggering, by the vehicle control system, playback of first audio indicative of the first operational mode;

receiving, in the vehicle control system, a second event associated with a second operational mode related to the vehicle; and responsive to the second event, triggering, by the vehicle control system, playback of second audio in correspondence to a predefined time relationship between the first audio and the second audio, such that substantially continuous audio indicative of the second operational mode is played to the user, the substantially continuous audio comprising at least a portion of the first audio and at least a portion of the second audio, the triggering playback of the second audio comprising:

determining an elapsed time since the triggering of playback of the first audio;

determining a termination point in the first audio based on the elapsed time;

selecting the second audio from a plurality of audio options based on the determined termination point;

terminating the first audio at the termination point; and starting the second audio substantially simultaneously with the terminating.

2. The method of claim 1, wherein the second event is received during the triggered playback of the first audio.

3. The method of claim 2, wherein the triggering playback of the second audio comprises starting the second audio substantially simultaneously with a termination of the first audio.

4. The method of claim 3, wherein the triggering playback of the second audio further comprises terminating the first audio prior to completion and at a predefined termination point in the first audio.

5. The method of claim 1, wherein the triggering playback of the first audio occurs a predefined time duration after the receiving the first event.

6. The method of claim 5, wherein the predefined time duration is nonzero.

7. The method of claim 1, further comprising, in response to determining that the second event satisfies a time constraint relative to the first event, the vehicle control system associating the second event with the second operational mode.

8. The method of claim 1, wherein the second operational mode represents a progression in a plurality of operational levels related to the vehicle.

9. The method of claim 8, wherein the plurality of operational levels correspond to levels of automatic driver assistance provided by the vehicle control system, the second operational mode representing an increased level of automatic driver assistance relative to the first operational mode.

10. The method of claim 9, wherein:

the first operational mode comprises adaptive cruise control; and the second operational mode comprises highway assistance.

11. The method of claim 1, wherein the first event and the second event comprise user inputs received via the same input device.

12. The method of claim 1, wherein the first event and the second event comprise automated notifications of safety conditions relative to the vehicle.

13. The method of claim 1, wherein the substantially continuous audio comprises a sequence of sounds indicative of the second operational mode, the at least a portion of the first audio comprising at least one of the sequence of sounds.

14. A system for audibly alerting a user of a vehicle, the system comprising:

a vehicle speaker; and a vehicle control system communicably coupled to the vehicle speaker, wherein the vehicle control system is operable to:

receive a first event associated with a first operational mode related to the vehicle;

responsive to the first event, trigger playback, on the vehicle speaker, of first audio indicative of the first operational mode;

receive a second event associated with a second operational mode related to the vehicle; and responsive to the second event, trigger playback, on the vehicle speaker, of second audio in correspondence to a predefined time relationship between the first audio and the second audio, such that substantially continuous audio indicative of the second operational mode is played to the user, the substantially continuous audio comprising at least a portion of the first audio and at least a portion of the second audio, wherein the triggering playback of the second audio comprises:

determining an elapsed time since the triggering of playback of the first audio;

determining a termination point in the first audio based on the elapsed time;

selecting the second audio from a plurality of audio options based on the determined termination point;

terminating the first audio at the termination point; and starting the second audio substantially simultaneously with the terminating.

15. The system of claim 14, wherein the second event is received during the triggered playback of the first audio.

16. The system of claim 14, wherein the vehicle control system is further operable, in response to determining that the second event satisfies a time constraint relative to the first event, to associate the second event with the second operational mode.

17. The system of claim 14, wherein the second operational mode represents a progression in a plurality of operational levels related to the vehicle, the plurality of operational levels corresponding to levels of automatic driver assistance provided by the vehicle control system.

18. The system of claim 14, wherein the first event and the second event comprise user inputs received via the same input device.

19. A method of audibly alerting a user of a vehicle, the method comprising:

receiving, in a vehicle control system, a first event associated with a first operational mode related to the vehicle;

responsive to the first event, triggering, by the vehicle control system, playback of first audio indicative of the first operational mode;

receiving, in the vehicle control system, a second event associated with a second operational mode related to the vehicle;

in response to determining that the second event satisfies a time constraint relative to the first event, the vehicle control system associating the second event with the second operational mode; and responsive to the second event, triggering, by the vehicle control system, playback of second audio in correspondence to a predefined time relationship between the first audio and the second audio, such that substantially continuous audio indicative of the second operational mode is played to the user, the substantially continuous audio comprising at least a portion of the first audio and at least a portion of the second audio.

* * * * *